Patented Dec. 5, 1933

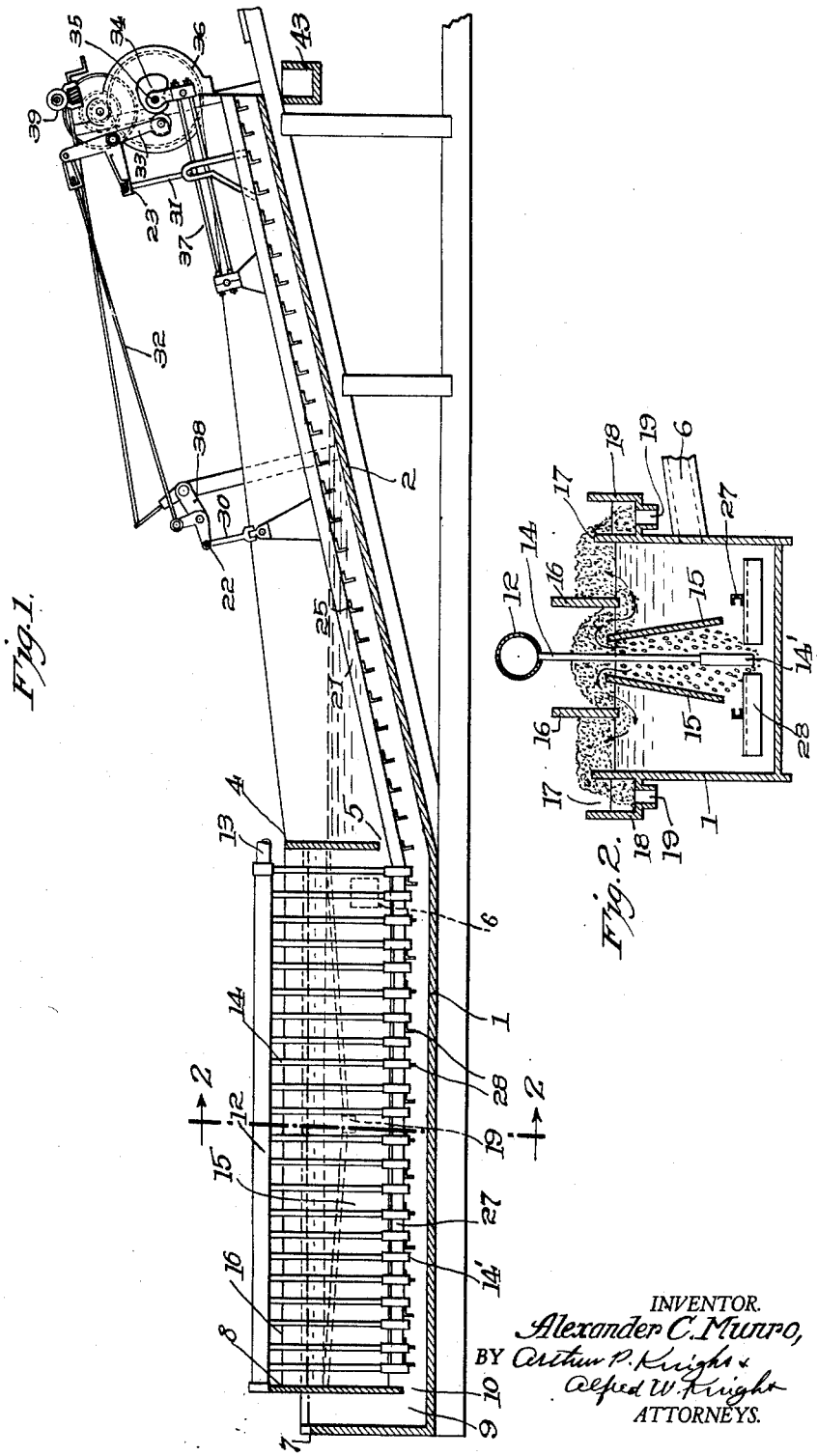

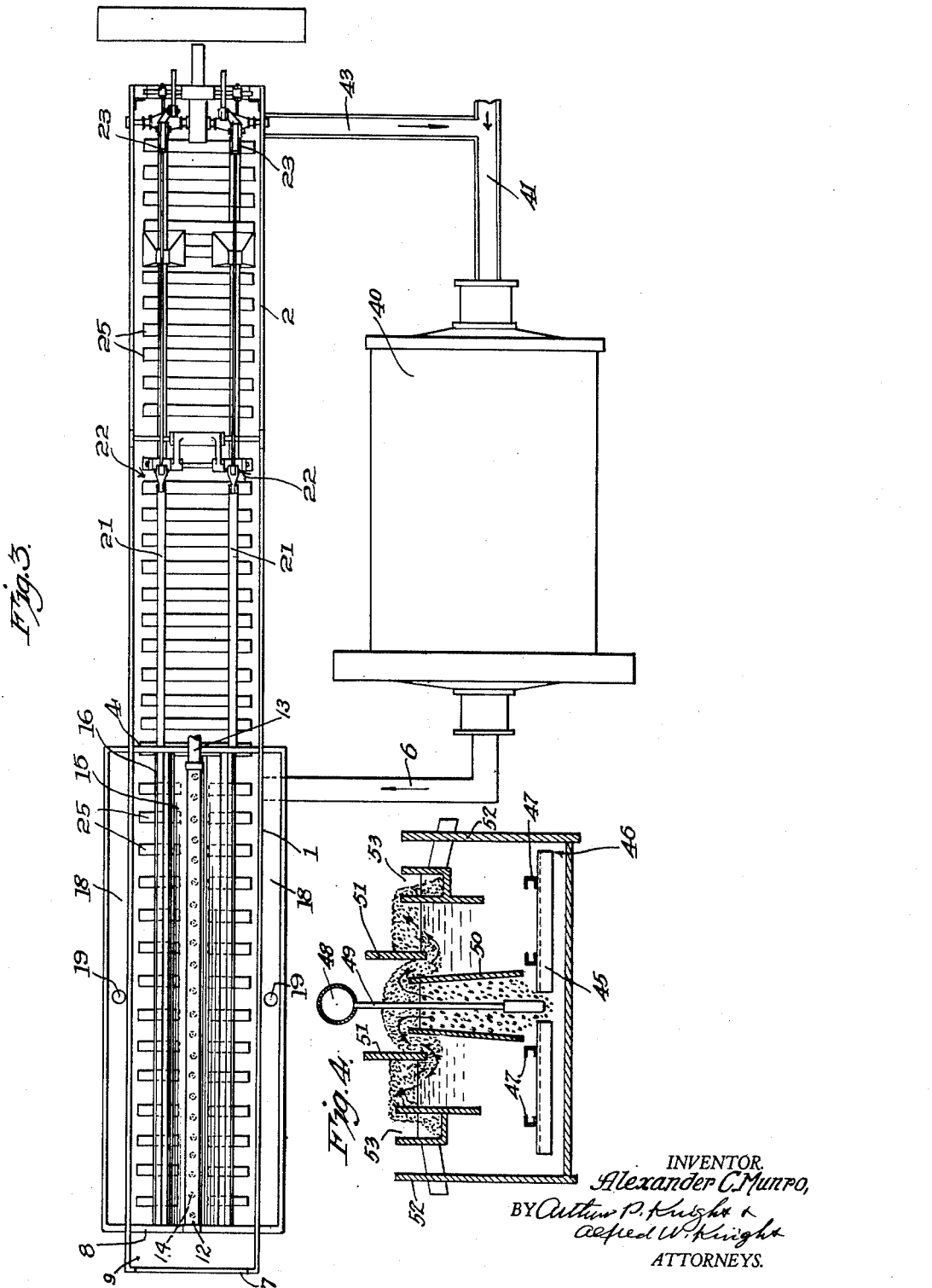

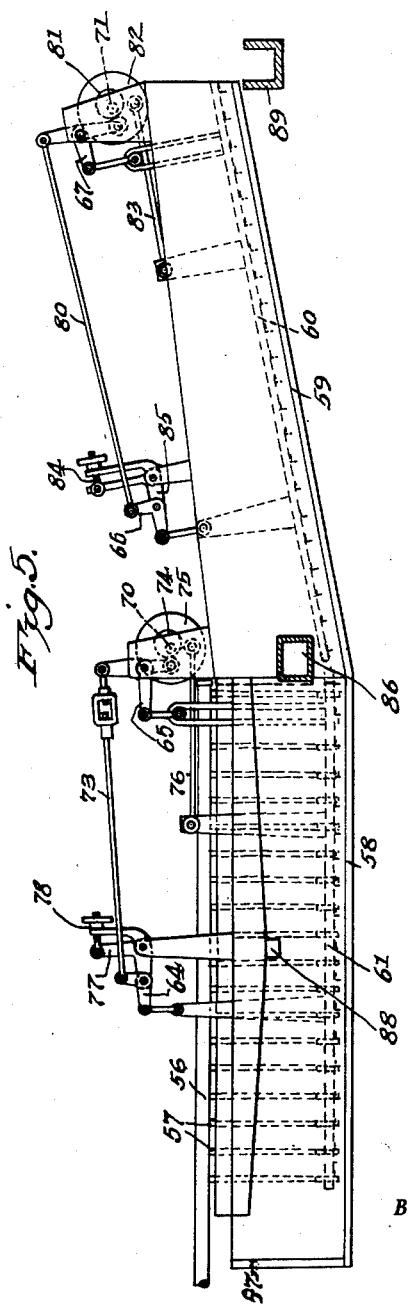

1,937,837

UNITED STATES PATENT OFFICE 1,937,837

ORE CONCENTRATION

Alexander C. Munro, Britannia Beach, British Columbia, Canada

Application June 9, 1930. Serial No. 459,925

3 Claims. (Cl. 209—168)

This invention relates to the treatment of ores for the concentration of mineral values therein, and the main object of the invention is to provide for effective and economical concentration of ores which are amenable to flotation. A further object of the invention is to provide for concentration of ores by a combined classifying and flotation operation. Another object of the invention is to provide for effecting the concentration of ores by flotation in such manner as to reduce to a minimum the amount of slimes present thereby increasing the efficiency of flotative concentration. Other objects of the invention will appear hereinafter.

The accompanying drawings illustrate embodiments of my invention and referring thereto:

Fig. 1 is a vertical longitudinal section of one form of such apparatus.

Fig. 2 is a section on line 2—2 in Fig. 1.

Fig. 3 is a plan view of the apparatus shown in Figs. 1 and 2.

Fig. 4 is a transverse section of a modified form of the flotation apparatus.

Fig. 5 is a side elevation of another modified form of the apparatus.

Referring to Figs. 1 and 3, the apparatus shown therein comprises a box or trough which includes a horizontally extending portion 1 and an inclined portion 2 extending upwardly from one end of the horizontal portion 1 at an appropriate angle suitable for the classifying operation as hereinafter described. The inclined portion 2 of the box or trough contains suitable classifying means, preferably of the reciprocating rake type, and the horizontal portion 1 of the box or trough contains flotation means of any suitable type and preferably of the aeration type. The two portions 1 and 2 of the box or trough are partially separated by a bulk head or partition 4, whose lower end is spaced sufficiently from the bottom of the trough to provide a passage 5 establishing communication between the portions 1 and 2 of the trough. A conduit 6 opens into the trough adjacent to the separating means 4, the location of said conduit being indicated by broken lines in Fig. 1, it being understood however that this conduit may open into the trough at either side of the partition 4. An overflow for tailings is provided at the end of the portion 1 of the box or trough remote from the inclined portion 2 thereof as indicated at 7, and a partition or bulk head 8 extends across the trough portion 1 to separate the flotation portion of the apparatus from the uptake 9 leading to said overflow, the lower end of said partition 8 being spaced from the bottom of the portion 1 of the trough to form a passage 10 through which tailings may pass to said overflow. A suitable launder (not shown) may be provided for carrying away the tailings from the overflow 7.

The flotation means provided in the portion 1 of the box or trough may be of any suitable type, for example, of the aeration type shown, comprising a manifold 12 connected to a supply pipe 13 for compressed air, and having a plurality of vertical pipes 14 connected thereto and extending downwardly therefrom, and provided at their lower ends with nozzles 14' for distributing air into the body of pulp within the portion 1 of the trough and adjacent to the bottom thereof. Lower partitions 15 extend longitudinally in the portion 1 of the trough at either side of the series of pipes 14. Upper partitions or baffles 16 extend at either side of said series of pipes and are spaced from the respective partitions 15 so as to form passages through which the flotation froth ascending from between the partitions 15 may be deflected outwardly and then upwardly, as shown by arrows in Fig. 2, to the froth overflow at either side of the trough as indicated at 17. A launder 18 is provided at either side of the trough for receiving the flotation concentrate, said launder discharging through a suitable outlet indicated at 19. The flotation means described is of well known type and it will be understood that any other suitable type of flotation means may be used.

In connection with the flotation means I provide raking means operating as a classifying and agitating means, and preferably operating in conjunction with classifying means contained in the inclined trough portion 2. Said classifying means may be of any suitable type, being for example of the reciprocating rake type, such as disclosed in patent to D. J. Nevill October 12, 1915, No. 1,156,543 and known as the Dorr raking classifier. Such classifier comprises longitudinal frame bars or rails 21 which are mounted on movable supporting means 22 and 23 so as to provide for longitudinal reciprocation accompanied by vertical motion, such as is required for the classifying operation. Cross bars 25 forming rake or hoe members are attached to the longitudinal members 21 and extend downwardly therefrom in the usual manner of such devices. In the form of my invention shown in Fig. 1, the longitudinal members 21 are provided with horizontal extensions 27 which extend within the trough portion 1 and are provided with cross arms or members 28 adapted to act as rake or hoe members as hereinafter described.

Any suitable means may be used for supporting and operating the classifying rake or hoe means above described, for example, the supporting means 22 and 23 may consist of bell cranks connected to the rail members 21 by links 30 and 31 and connected together by rod 32 so as to operate in unison. The bell crank 23 has a lever arm 33 operated by cam 34 on a shaft 35 driven by any suitable means, said shaft also carrying and operating a crank wheel 36 connected by pitman or connecting rod 37 to the rail means 21, so that rotation of said crank wheel 36 operates through pitman 37 to reciprocate the rake or hoe means, and operation of the lever arm 33 by cam 34 operates through the means 23, 32 and 22 to alternately raise and lower the rake or hoe means. The effect of this operation is to cause the rake members or cross bars 25 to be drawn upwardly and forwardly along or close to the inclined floor of the trough portion 2 and to be then lifted, moved back, and then lowered again for a further forward movement. As regards the classifying portion of the apparatus contained in trough portion 2, the operation is similar to that of the ordinary raking classifier, such as the Dorr classifier, and the portions of the apparatus formed by the extension bars 27 and the rake or hoe members 28 carried thereby, being supported and operated by the rail members 21, are given a similar motion and operate in a similar manner upon the material contained in the trough portion 1. The bell crank 22 is shown as mounted on a pivoted supporting member 38, which may be adjusted by manually operated means 39, so as to control the spacing between the rake means and the bottom of the trough, substantially as set forth in patent to Nevill, aforesaid.

The apparatus above described is preferably used in conjunction with a grinding mill so as to be in closed circuit therewith. Thus, as shown in Fig. 3, a grinding mill which may be a ball mill, rod mill or the like, indicated at 40, has its inlet connected to a supply launder or conduit 41 and its outlet connected to a launder or conduit 6, leading to the flotation portion 1 of the apparatus above described. At the upper end of the trough portion 2 of the classifier apparatus, the material discharged therefrom by the operation of the rake means falls into a suitable launder or conveying means 43 whereby it is conducted to the supply conduit 41 of the grinding mill.

In applying my invention in connection with the above described apparatus for the treatment of ore containing flotatable material, such as copper sulphide, lead sulphide, etc., the ore in suitably crushed or divided condition is supplied along with a suitable amount of water to the inlet conduit 41 for the grinding mill, and is subjected in said mill to a grinding operation whereby it is ground or further subdivided and the pulp containing the finely divided material passes from the mill through the conduit 6 to the tank portion 1. In said tank portion 1, the pulp is subjected to agitating and raking action by operation of the members 28 as aforesaid, and at the same time subjected to flotation action by the aerating means described, it being understood that a suitable flotation agent or agents, such as oils, cresols or other substances having the required flotative properties, are added to the pulp before or after it enters the flotation part of the apparatus. The froth containing the concentrates flows over the sides of the trough into the launders 8, from which it is discharged to any suitable receiving means, and the tailings pass to the overflow at 7 to any suitable means for receiving or conveying same.

The operation of the raking means 28 prevents clogging of the pulp and continually agitates the pulp so that the lighter particles are more effectively suspended in the liquid for operation of the flotation means thereon, while at the same time the larger particles in the pulp are continually advanced toward the classifying part of the apparatus and eventually are moved through the passage 5 and are caused to travel upwardly along the floor of the inclined portion of the trough by operation of the rake means 25. The water level in the flotation part of the apparatus is substantially that of the overflow lip at 7, but the water level in the classifying part of the apparatus may be considerably lower as indicated, the aeration action in the flotation operation tending to raise the water level in that part of the apparatus. As the material is drawn upwardly in the classifying trough portion 2, the heavier or larger particles are further separated from the lighter particles, the latter remaining in suspension and the heavier or larger particles being eventually moved to the upper end of the trough portion 2 and discharged into the launder 43 whereby they are conducted back to the inlet 41 for the grinding mill.

Some of the advantages of the above described process are the following:

1. The ground mineral in the grinding circuit is subjected to immediate flotation when the particles are ground to the necessary degree of fineness for flotation, thus impoverishing the circulating feed return to the mill.

2. Much less sliming of mineral occurs in the process. Unnecessary sliming of mineral is always objectionable. Owing to the mineral being of higher specific gravity than the gangue, the mineral is ground unduly fine in the ordinary closed circuit of classifier and grinding mill.

3. The size of the flotation apparatus and the power per ton of ore treated are reduced. These important advantages are obtained because less sliming of the mineral occurs. The capacity of a flotation plant is governed by the amount of mineral slime present.

4. Less floor space, less labor and less maintenance expense are required.

The following results have been obtained in a period of operation of two weeks, operating upon copper sulphide ore: With the flotation-classifier connected in closed circuit with the grinding mill as above described, and with the original heads passing through the mill containing 1.10% copper, the circulating load discharged by the raking means and returned to the grinding mill contained .80% copper, and the tailings contained .108% copper. In the normal operation at the same plant, in which the grinding mill was connected in closed circuit with a classifier, but with the flotation means excluded from the closed circuit, and operating upon substantially the same ore, the circulating load returned to the mill contained 2.35% copper and the tailings contained .132% copper.

As shown in Fig. 4, the flotation part of the apparatus may be made considerably wider than is usually the case in apparatus of this kind, the operation of the rake or hoe means serving to prevent choking or clogging of the pulp such as would occur with the ordinary aerating flotation apparatus in case the trough is made too wide. In this figure, the trough portion containing the flotation means is indicated at 46, the raking devices 45 being carried by bars 47 which are operated similarly to the bars carrying the raking devices in the form shown in Figs. 1 to 3, and the flotation means is substantially the same as before described, comprising a manifold 48 for supply of compressed air, aeration pipes 49, partitions 50 and baffles 51 mounted in the manner above described. The side walls 52 for the trough portion 46 are in this case shown as spaced outwardly from the concentrate launders 53 so as to provide increased capacity for the apparatus. In other respects, the apparatus is similar to that above described in construction and operation.

As shown in Fig. 5, the raking means operating in the flotation part of the apparatus may be operated separately from the raking means in the classifying portion of the apparatus. In this figure, the trough is provided with a portion 58 for containing the flotation apparatus and a trough portion 59 for containing the classifying apparatus indicated at 60, and the raking means 61 in the flotation portion of the trough may be supported and operated by means 64 and 65 similar to the means 66 and 67 for supporting and operating the classifying means 60, separate driving shafts 70 and 71 being provided for the respective operating means so that if desired the raking devices in the flotation portion of the apparatus may be operated at a different speed or in a different manner from the raking means in the classifying portion of the apparatus. The flotation means may comprise an air supply pipe 56 and distributing pipes 57, as above described.

Any suitable mechanism may be used for supporting and operating the raking devices. In the form shown, the supporting and operating means 64 and 65 consists of bell cranks connected together by rod 73 so as to operate in unison and operated by cam means 74 on the shaft 70, said shaft also carrying a crank wheel 75 connected by pitman 76 to the raking means 61. Bell crank 64 which supports the middle portion of the raking means 61 is shown as adjustably mounted on a support 77 whose position is controlled by manual adjustment means 78 so as to raise or lower the raking means 61.

The supporting and operating means for the raking means 60 comprise bell cranks 66 and 67, connected by rod 80 so as to operate in unison, bell crank 67 being operated by a cam 81 on shaft 71, said shaft also operating to reciprocate the raking means 60 through crank wheel 82 and pitman 83. Adjusting means 84 is also shown as provided for raising or lowering an arm 85 carrying the bell crank 66 for supporting the raking means 60 so as to cause the raking means 60 to sweep more or less close to the bottom of the trough portion 59. The pulp to be operated upon is supplied through an intake conduit 86, the tailings passing off at 87, the concentrates at 88 and the oversize from the classifying portion of the apparatus being discharged at the upper end of the trough portion 59 to the conduit 89 leading to grinding mill as above described. The construction and operation of the apparatus shown in Fig. 5 may be in other respects substantially the same as in the form shown in Figs. 1 and 3. The inlet for material to be operated upon may open into any part of the trough intermediate the ends thereof, that is to say, between the tailings overflow point and the upper end of the classifier portion, where the coarser materials are discharged. Thus, as shown in Fig. 5, it may open into the classifier portion of the apparatus, instead of into the flotation portion of the apparatus as shown in Fig. 1.

I claim:

1. A flotation-classifier comprising a trough, means for supplying material to be treated to said trough at a point intermediate its ends, said trough being provided with an overflow for tailings at one end and with overflow for concentrates at the side thereof, means for supplying compressed gaseous medium to the trough between said inlet and said tailings overflow, raking means mounted to move adjacent the bottom of the trough and means for operating said raking means so as to subject the material in the trough to a raking operation simultaneously with the flotation operation and means at the end of the trough remote from the tailings overflow for removing coarser material separated by said raking operation.

2. A flotation-classifier comprising a trough having an inlet for material to be treated intermediate its ends and having an overflow for tailings at one end thereof and provided with an inclined floor at the portion thereof remote from said tailings overflow, raking means mounted in said trough between said inlet and said tailings overflow and provided with means for operation thereof so as to cause coarser material to be raked away from the tailings overflow, classifier raking means mounted over the inclined portion of the trough and provided with means for operation thereof to cause the coarser material to be raked upwardly on said inclined floor, and flotation means in the portion of the trough between said inlet and the tailings overflow to subject the material therein to a flotation operation concurrently with the operation of the raking means.

3. An apparatus as set forth in claim 2, in which the raking means operating in the portion of the trough between the inlet and the tailings overflow is carried and operated by the said classifier raking means.

ALEXANDER C. MUNRO.